F. EVANS.
PRESSURE GAGE.
APPLICATION FILED OCT. 8, 1917.

1,397,728.

Patented Nov. 22, 1921.

INVENTOR.
Fred Evans
BY Abel L. Browning
his ATTORNEY

UNITED STATES PATENT OFFICE.

FRED EVANS, OF SUMMIT, NEW JERSEY, ASSIGNOR TO A. SCHRADER'S SON, INCORPORATED, OF BROOKLYN, NEW YORK, A CORPORATION OF NEW YORK.

PRESSURE-GAGE.

1,397,728.     Specification of Letters Patent.     Patented Nov. 22, 1921.

Application filed October 8, 1917. Serial No. 195,322.

*To all whom it may concern:*

Be it known that I, FRED EVANS, a citizen of the United States, residing at Summit, in the county of Union and State of New Jersey, have invented a certain new and useful Improvement in Pressure-Gages, of which the following is a specification.

This invention relates generally to pressure gages and more particularly to that type of pressure gage employed in measuring the pressure of air in pneumatic tires to control the inflation thereof.

The main object of the invention is to provide an improved form of pressure gage in which the indicating plunger that forms a characteristic part of the structure of devices of this general nature heretofore known, is replaced by an indicating device of the rotary type.

Other features of the invention will be hereinafter described.

In the drawing, in which a preferred embodiment of the invention is selected for illustrative purposes, Figure 1 is a vertical, sectional view of a device embodying the invention.

Figure 2:
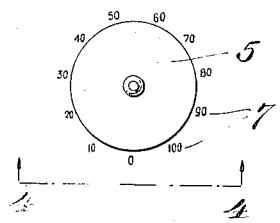
Fig. 2 is a plan view of the device shown in Fig. 1.
Figure 3:
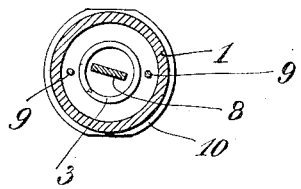
Fig. 3 is a horizontal, sectional view of the device taken at the line 3—3 of Fig. 1.
Figure 1:
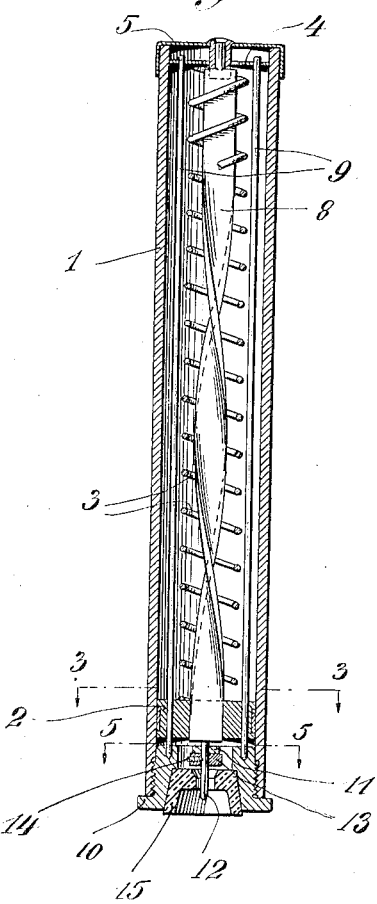
Figure 4:
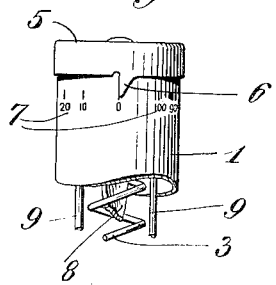
Fig. 4 is a detached, detailed view of the indicating mechanism.
Figure 5:
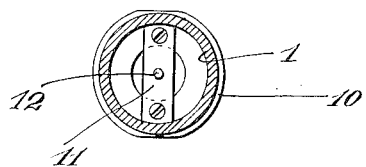
Fig. 5 is a horizontal sectional detailed view of the device taken at the line 5—5 of Fig. 1.

In the drawing a cylindrical casing 1 is provided with a piston 2 which is arranged to reciprocate in the casing 1. A helical spring 3, engaging at its upper end the fixed stop member 4, bears at its lower end directly against the piston and, when unopposed by a counter force, holds the piston normally in the position shown in Fig. 1 of the drawing.

One end of the casing 1 is provided with a cap member 5 that is arranged to rotate directly on the end of the casing and is provided with an indicating pointer 6 that is caused to pass over a circumferentially arranged scale of pressure indicating characters when the cap member 5 is rotated. Means are provided for connecting the cap 5 to the piston 2 so that the reciprocating movement of the piston 2 is converted into rotary movement of the cap member 5 and indicating pointer 6. This structure takes the form of a helical member 8 attached to the cap member 5 so that the cap member 5 and helical actuating member 8 are caused to rotate together.

In order to rotate the helical actuating member 8, the piston 2 is provided with an opening which the member 8 passes through, so that as the piston is moved back and forth in the casing 1, a rotating movement is given to the actuating member 8 and to the cap member 5 and indicating pointer 6. It will be seen that the extent of movement of the piston 2 will be correspondingly indicated on the scale 7 by the pointer 6. Suitable means, such as the guide rods 9, are provided that pass through the piston in a sliding relation thereto so as to prevent any rotary movement of the piston.

The end of the casing 1 remote from the indicating mechanism is provided with means for opening the valve of a pneumatic tire and placing the interior of the casing at the corresponding end of the piston in communication with the compressed air in the tire so that the degree of pressure that exists can be measured. A thimble 10 is arranged to have threaded engagement with the end of the casing 1 and carries a bridging member 11 that acts as a bearing for a pin 12 projecting from the end of the helical actuating member 8. The pin 12 preferably projects in such manner that it may be used to press against the tire valve stem to thereby open the valve and allow air from the interior of the tire to flow into the end of the casing 1. Preferably a stop member 13 is attached to the pin 12 by means of a set screw 14 so as to press against the bridge piece 11 when in valve opening position and resist the tendency that would otherwise exist on the part of the actuating member to push the cap member 5 from its place on the end of the casing 1. A suitable yielding tire valve tube engaging member 15 made of rubber or the like, is employed to prevent the leakage of air between the end of the tire valve tube and the casing 1 when the device is in use.

In the operation of the device the gage is applied to a tire valve in such a way that the pin 12 presses the tire valve off its seat and allows air from the tire to enter the casing 1 and press the piston 2 along the casing against the force of the spring 3. It will be obvious that different degrees of pressure of the air in the tire will move the piston to different positions in the casing 1 and that correspondingly different indications will be shown by the pointer 6.

Having thus described my invention, what I claim as new and desire to secure by Letters Patent of the United States, is—

1. A pressure gage comprising a cylinder adapted to receive a pressure fluid at one end thereof, an indicating member rotatably mounted on said cylinder, a spring-resisted piston in said cylinder arranged to be moved longitudinally to the axis of said cylinder by the pressure fluid, said cylinder and piston having a leak-tight connection, whereby the pressure medium is prevented from passing from the pressure side of the piston to the opposite side thereof, means having a torque reaction on the piston for utilizing the movement of said piston to rotate said indicating member, and means for preventing the rotation of said piston.

2. A pressure gage comprising a cylinder adapted to receive a pressure fluid at one end thereof, an indicating member rotatably mounted on the other end of said cylinder, a scale circumferentially arranged on said cylinder in coöperative relation to said indicating member, a spring-resisted piston in said cylinder arranged to be moved longitudinally of the axis of said cylinder by the pressure fluid, said cylinder and piston having a leak-tight connection whereby the pressure medium is prevented from passing from the pressure side of the piston to the opposite side thereof, means having a torque reaction on the piston for converting the reciprocating movement of said piston into rotary movement of said indicating member, and means for preventing the rotation of said piston.

3. A pressure gage comprising a cylinder having means at one end for opening a tire valve to thereby admit pressure fluid to said cylinder, an indicating member rotatably mounted on the other end of said cylinder, a scale arranged on said cylinder in coöperative relation to said indicating member, a spring-resisted piston in said cylinder arranged to be moved longitudinally of the axis of said cylinder by the pressure fluid, said cylinder and piston having a leak-tight connection whereby the pressure medium is prevented from passing from the pressure side of the piston to the opposite side thereof, guiding means arranged to prevent rotation of the piston, and a helical member adapted to be turned by said piston for converting the right-line movement of said piston into a rotary movement of said indicating member.

4. A pressure gage comprising a cylinder adapted to receive a pressure fluid at one end thereof, an indicating member rotatably mounted on the other end of said cylinder, a scale circumferentially arranged on said cylinder in coöperative relation to said indicating member, a spring-resisted piston in said cylinder arranged to be moved longitudinally of the axis of said cylinder to different extents depending upon differences in pressure exerted by the fluid, said cylinder and piston having a leak-tight connection, whereby the pressure medium is prevented from passing from the pressure side of the piston to the opposite side thereof, guiding means arranged to prevent rotation of the piston and a helical member attached to said indicating member and projecting in a sliding relation through a correspondingly shaped opening in said piston, whereby movement of said piston along said cylinder rotates said indicating member.

5. A pressure gage comprising a cylinder having means at one end for opening a tire valve to thereby admit pressure fluid to said cylinder, an indicating member rotatably mounted on the other end of said cylinder, a scale arranged on said cylinder in coöperative relation to said indicating member, a spring-resisted piston in said cylinder arranged to be moved longitudinally of the axis of said cylinder by the pressure fluid, said cylinder and piston having a leak-tight connection whereby the pressure medium is prevented from passing from the pressure side of the piston to the opposite side thereof, means for preventing rotation of said piston, and a helical member associated with both the piston and indicating member and adapted to be turned by said piston for converting the right-line movement of said piston into a rotary movement of said indicating member.

6. A pressure gage comprising a cylinder having means at one end for opening a tire valve to thereby admit pressure fluid to said cylinder, an indicating member rotatably mounted on the other end of said cylinder, a scale arranged on said cylinder in coöperative relation to said indicating member, a spring-resisted piston in said cylinder arranged to be moved longitudinally of the axis of said cylinder by the pressure fluid, said cylinder and piston having a leak-tight connection whereby the pressure medium is prevented from passing from the pressure side of the piston to the opposite side thereof, guiding means arranged to prevent rotation of said piston, and a helical member attached to said indicating member and projecting in a sliding relation through a correspondingly shaped opening in said piston, whereby movement of said piston along said cylinder rotates said indicating member.

7. A pressure gage comprising a cylinder, pressure-responsive means, comprising a piston in said cylinder, said cylinder and piston having a leak-tight connection whereby the pressure medium is prevented from passing from the pressure side of the piston to the opposite side thereof, means preventing turning of said piston in the cylinder, said means comprising rods running longitudinally of the cylinder, means having a torque reaction on the piston for translating right-line movement of said piston into rotary movement, and a rotary indicating part actuated by said motion-translating means.

8. A pressure gage comprising a cylinder, pressure-responsive means, comprising a piston in said cylinder, said cylinder and piston having a leak-tight connection whereby the pressure medium is prevented from passing from the pressure side of the piston to the opposite side thereof, means preventing turning of said piston in the cylinder, means having a torque reaction on the piston for translating right-line movement of said piston into rotary movement, said means being in the form of a spiral strip adapted to be turned by longitudinal movement of the piston, and a rotary indicating part actuated by said motion-translating means.

9. A pressure gage comprising a straight tubular cylinder, a pressure-responsive means therein comprising a member having a leak-tight connection with the cylinder, whereby the pressure medium is prevented from passing from the pressure side to the opposite side thereof, means for preventing turning movement of said member, indicating means including a rotatable disk covering one end of said cylinder and connections adapted to convert the rectilinear movement of the pressure responsive member into rotary movement of the disk and a tire valve casing coupling at the other end of the cylinder.

10. A pressure gage comprising a straight tubular cylinder, pressure-responsive means therein comprising a piston having a leak-tight connection with the cylinder whereby the pressure medium is prevented from passing from the pressure side to the opposite side thereof, means for preventing turning movement of the piston and indicating means at the upper end of the cylinder and including a spiral strip adapted to be turned by the rectilinear movement of said piston, said cylinder having a coupling at its lower end and a bearing cross-strip at its upper end for said spiral strip and said coupling comprising a thimble fitting the other end of said cylinder and having a bearing part thereon for said spiral strip.

11. A pressure gage comprising a straight tubular cylinder, pressure-responsive means therein comprising a member having a leak-tight connection with the cylinder, whereby the pressure medium is prevented from passing from the pressure side to the opposite side thereof, means for preventing turning movement of said member, an indicating means at one end of the cylinder and a tire valve casing coupling at the other end, said indicating means including a spiral strip adapted to be turned by movement of said member, said cylinder having bearing strips at its upper and lower ends for said spiral strip.

Signed at New York, in the county of New York and State of New York, this 1st day of Oct., 1917.

FRED EVANS.